United States Patent
Lu (10) Patent No.: US 7,250,793 B2
(45) Date of Patent: Jul. 31, 2007

(54) LOW VOLTAGE DIFFERENTIAL SIGNALING DRIVING APPARATUS

(75) Inventor: Chao-Hsin Lu, Da-Yuan Shiang (TW)

(73) Assignee: Realtek Semiconductor Corp., Hsin Chu (TW)

( * ) Notice: Subject to any disclaimer, the term of this patent is extended or adjusted under 35 U.S.C. 154(b) by 0 days.

(21) Appl. No.: 10/754,726

(22) Filed: Jan. 12, 2004

(65) Prior Publication Data

US 2004/0150434 A1 Aug. 5, 2004

(30) Foreign Application Priority Data

Jan. 20, 2003 (TW) .............................. 92101151 A (51) Int. Cl.
 *H03B 1/00* (2006.01)
(52) U.S. Cl. ...................................... 327/108; 327/112
(58) Field of Classification Search ........ 327/108–112, 327/170, 379, 389, 391, 337, 427, 581, 65, 327/68–70, 563; 326/23, 24, 27, 82, 83, 326/86; 330/253, 255, 262–264, 269
 See application file for complete search history.

(56) References Cited

U.S. PATENT DOCUMENTS

| | | | |
|---|---|---|---|
| 6,313,662 B1 * | 11/2001 | Ide | 326/83 |
| 6,329,843 B1 * | 12/2001 | Hirata et al. | 326/82 |
| 6,566,933 B1 * | 5/2003 | Lye | 327/337 |
| 6,700,403 B1 * | 3/2004 | Dillon | 326/83 |
| 6,720,805 B1 * | 4/2004 | Haas | 327/108 |
| 6,788,116 B1 * | 9/2004 | Cook et al. | 327/108 |

\* cited by examiner

*Primary Examiner*—Long Nguyen
(74) *Attorney, Agent, or Firm*—Winston Hsu (57) ABSTRACT

A low voltage differential signaling (LVDS) driving apparatus is disclosed, which comprises an LVDS output circuit to output an LVDS differential signal; a switch circuit coupled to the LVDS output circuit to control the phase of the LVDS differential signal; and a reference current control circuit to provide a control voltage to the LVDS output circuit such that the magnitude of the LVDS differential signal is determined based on the control voltage.

12 Claims, 7 Drawing Sheets

LOW VOLTAGE DIFFERENTIAL SIGNALING DRIVING APPARATUS

BACKGROUND OF THE INVENTION

1. Field of the Invention

The present invention relates to a low voltage differential signaling (LVDS) driving apparatus, and more particularly, to a LVDS driving apparatus with low operation power.

2. Description of Related Art

Figure 1:
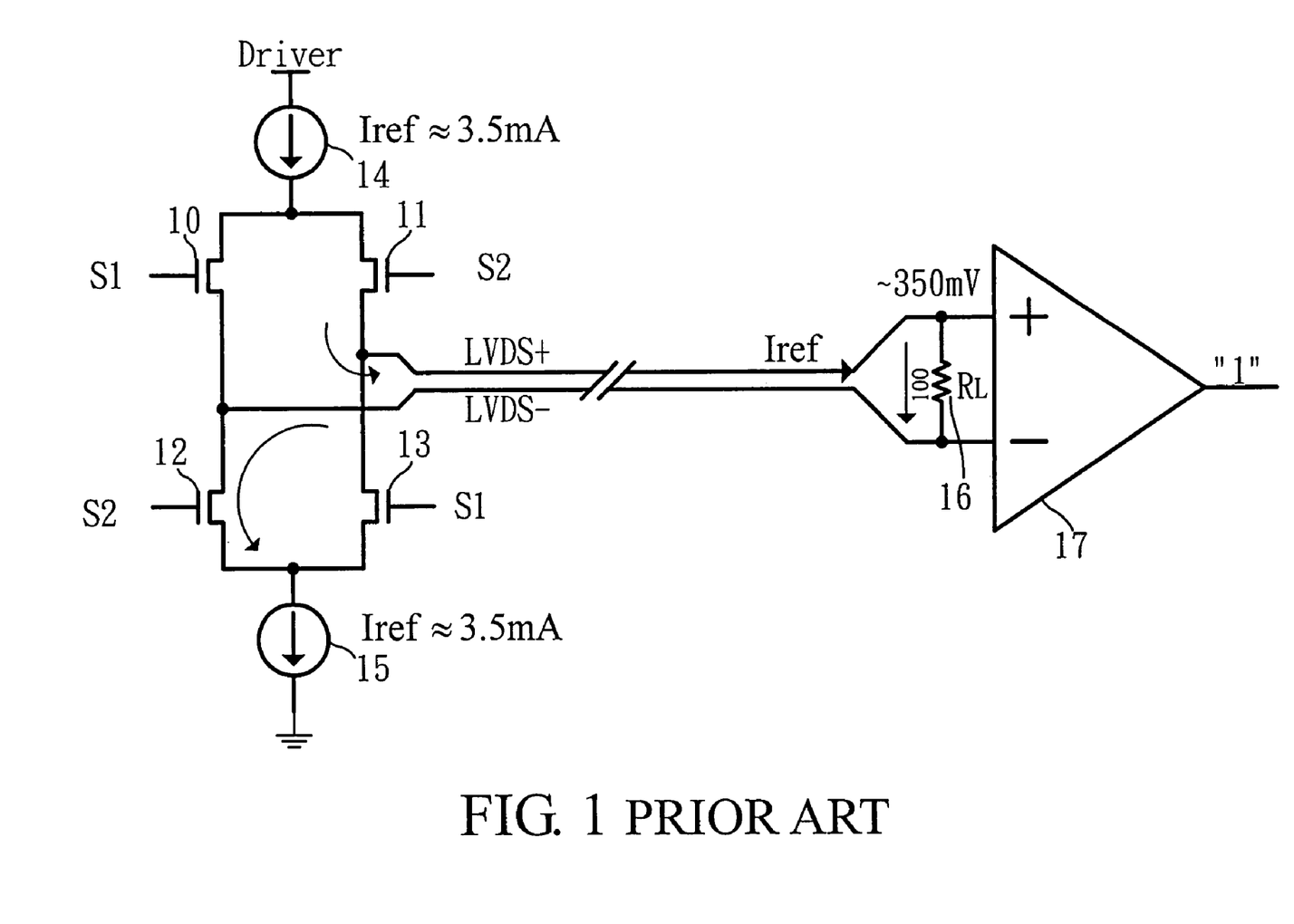
FIG. 1 shows a conventional LVDS driving circuit, which an output logic "1" is produced at the output-end.
Figure 2:
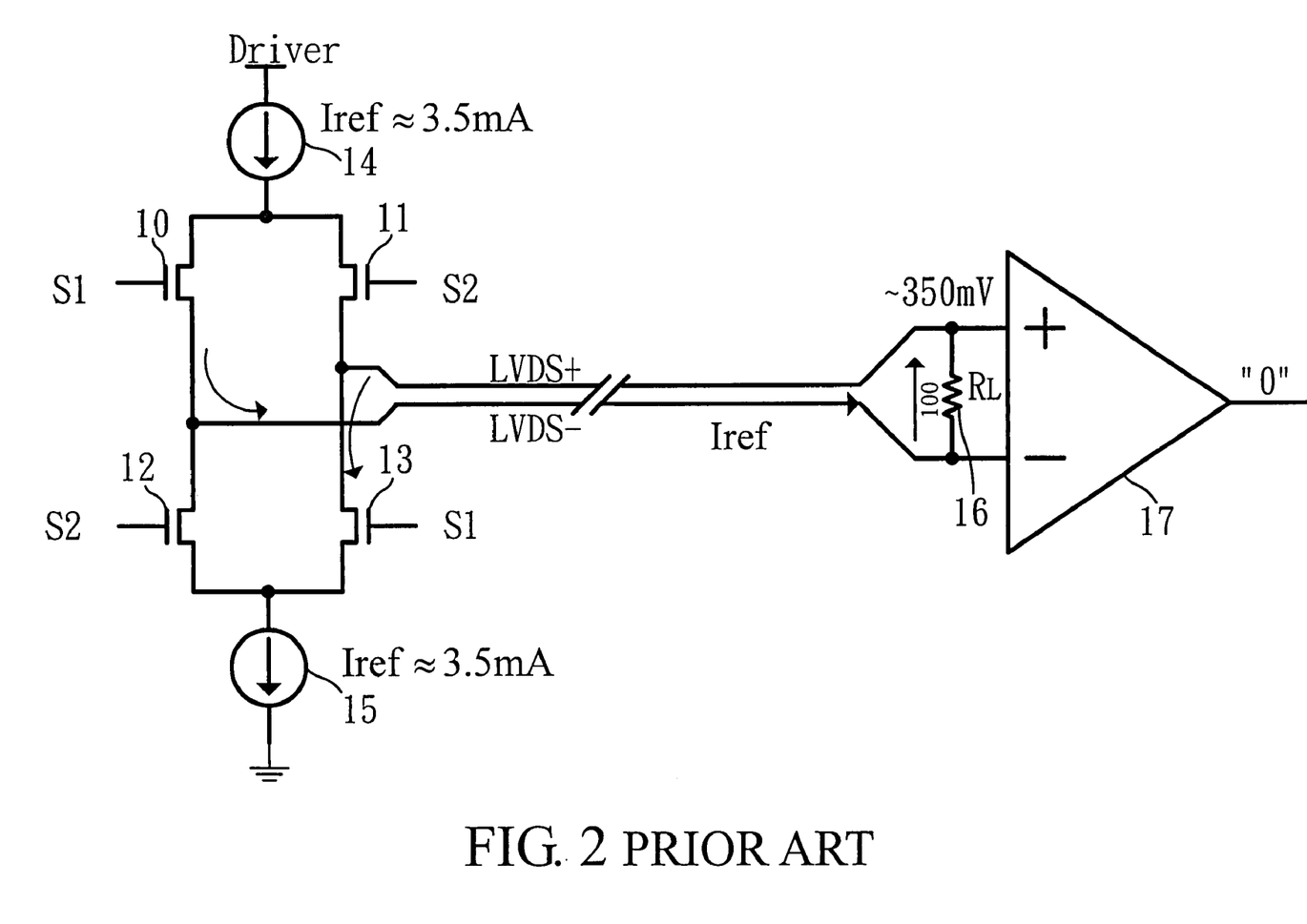
FIG. 2 shows a conventional LVDS driving circuit, which an output logic "0" is produced at the output-end.

FIGS. 1 and 2 show a conventional configuration of an LVDS driving circuit. The conventional LVDS driving circuit sets in the receiving end 17 includes four transistors 10, 11, 12, 13, and two current sources 14, 15, as shown in FIGS. 1 and 2. The ON/OFF status of the transistors 10 and 13 are controlled by the control signals S1, and that of the transistors 11 and 12 are controlled by the control signals S2. When the control signal S1 is LOW and S2 is HIGH, transistors 11 and 12 are ON and transistors 10 and 13 are OFF. Thus, a downward current is produced at the resistor 16 of the output-end 17 and an output logic "1" is produced based on the download current, as shown in FIG. 1. When the control signal S1 is HIGH and S2 is LOW, transistors 11 and 12 are OFF and transistors 10 and 13 are ON. Thus, a upward current is produced at the resistor 16 of the output-end 17 and an output logic "0" is produced based on the upload current, as shown in FIG. 2.

However, the power source VDD of the conventional LVDS driving circuit has to meet the limitation that $VDD > \Delta V_{14} + \Delta V_{15} + I_{ref} R_L + \Delta V_{11} + \Delta V_{12}$, wherein $\Delta V_{14}$ and $\Delta V_{15}$ are voltage drop of the current sources 14 and 15 respectively, and $\Delta V_{11}$ and $\Delta V_{12}$ are drain-to-source voltage drop of the transistors 11 (or 10) and 12 (or 13) respectively. That is, the minimum operational power VDD of the LVDS driving circuit must be no smaller than $\Delta V_{14} + \Delta V_{15} + I_{ref} R_L + \Delta V_{11} + \Delta V_{12}$, which is a relative large operational power requirement in a common integrated circuit. In addition, a complicated control circuit is needed to precisely control the current sources 14 and 15 such that the output current of the current sources 14 and 15 can be substantially the same.

SUMMARY OF THE INVENTION

The object of the present invention is to provide a low voltage differential signaling (LVDS) driving apparatus which the magnitude of the operation power can be reduced and the control circuit of the LVDS driving apparatus can be simplified.

To achieve the object, a low voltage differential signaling (LVDS) driving apparatus is disclosed, which comprises an LVDS output circuit to output an LVDS differential signal; a switch circuit coupled to the LVDS output circuit to control the phase of the LVDS differential signal; and a reference current control circuit to provide a control voltage to the LVDS output circuit such that the magnitude of the LVDS differential signal is determined based on the control voltage.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
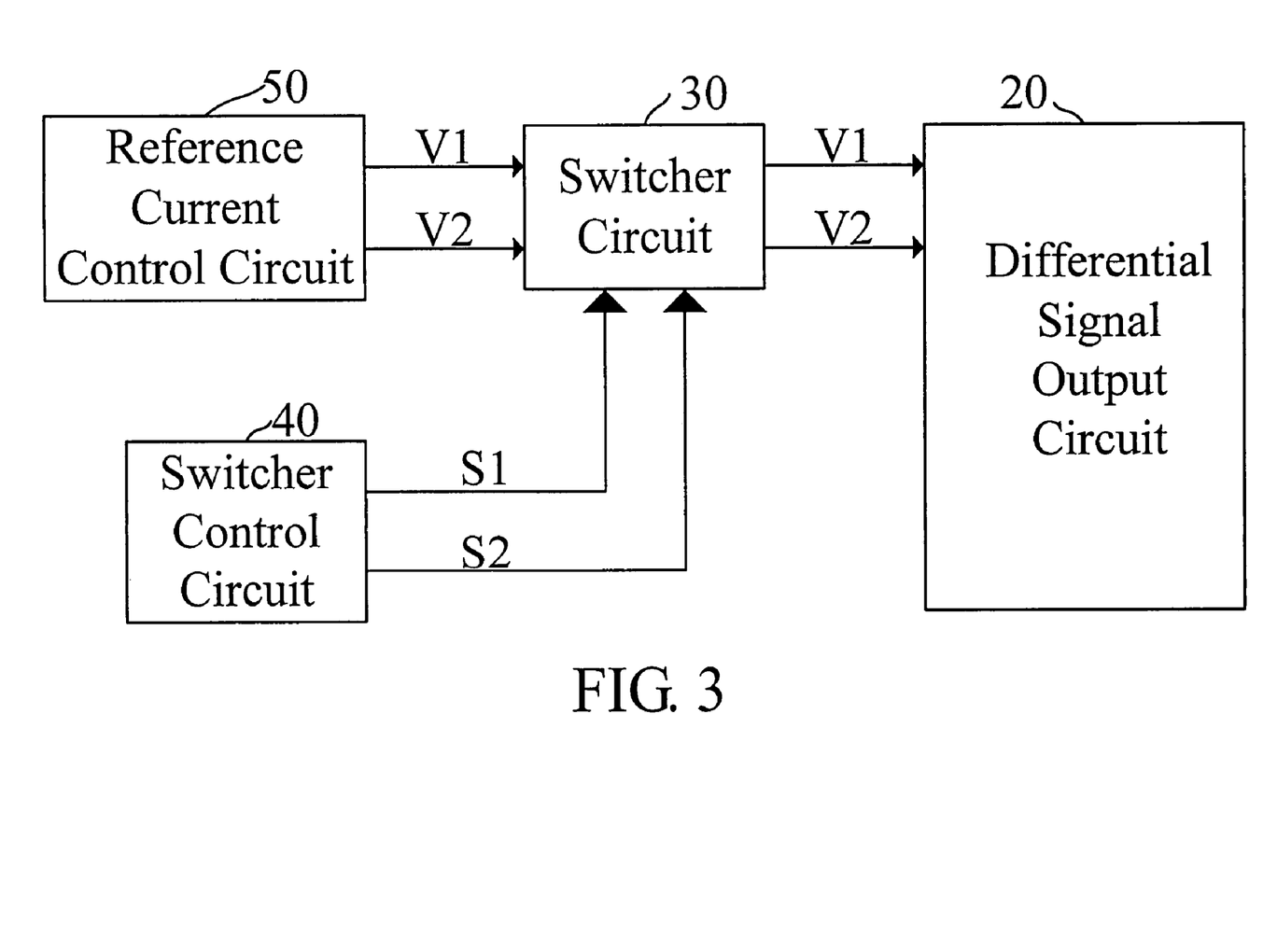
FIG. 3 is a block diagram of an LVDS driving circuit according to the embodiment of the present invention.

FIG. 3 is a block diagram of an LVDS driving apparatus according to the embodiment of the present invention. The LVDS driving circuit based on the embodiment of the present invention includes a differential signal output circuit 20, a switch circuit 30, a switch control circuit 40, and a reference current control circuit 50, as shown in FIG. 3. The differential signal output circuit 20 is for outputting an LVDS differential signal. The switch circuit 30 coupled to the differential signal output circuit 20 is for controlling the differential signal output circuit 20 to output the desired LVDS differential signal. The switch control circuit 40 coupled to the switch circuit 30 is for controlling the operation of the switch circuit 30 through outputting a first control signal S1 and a second control signal S2. The reference current control circuit 50 coupled to the differential signal output circuit 20 and the switch circuit 30 for providing a first control voltage V1 and a second control voltage V2.

Figure 4:
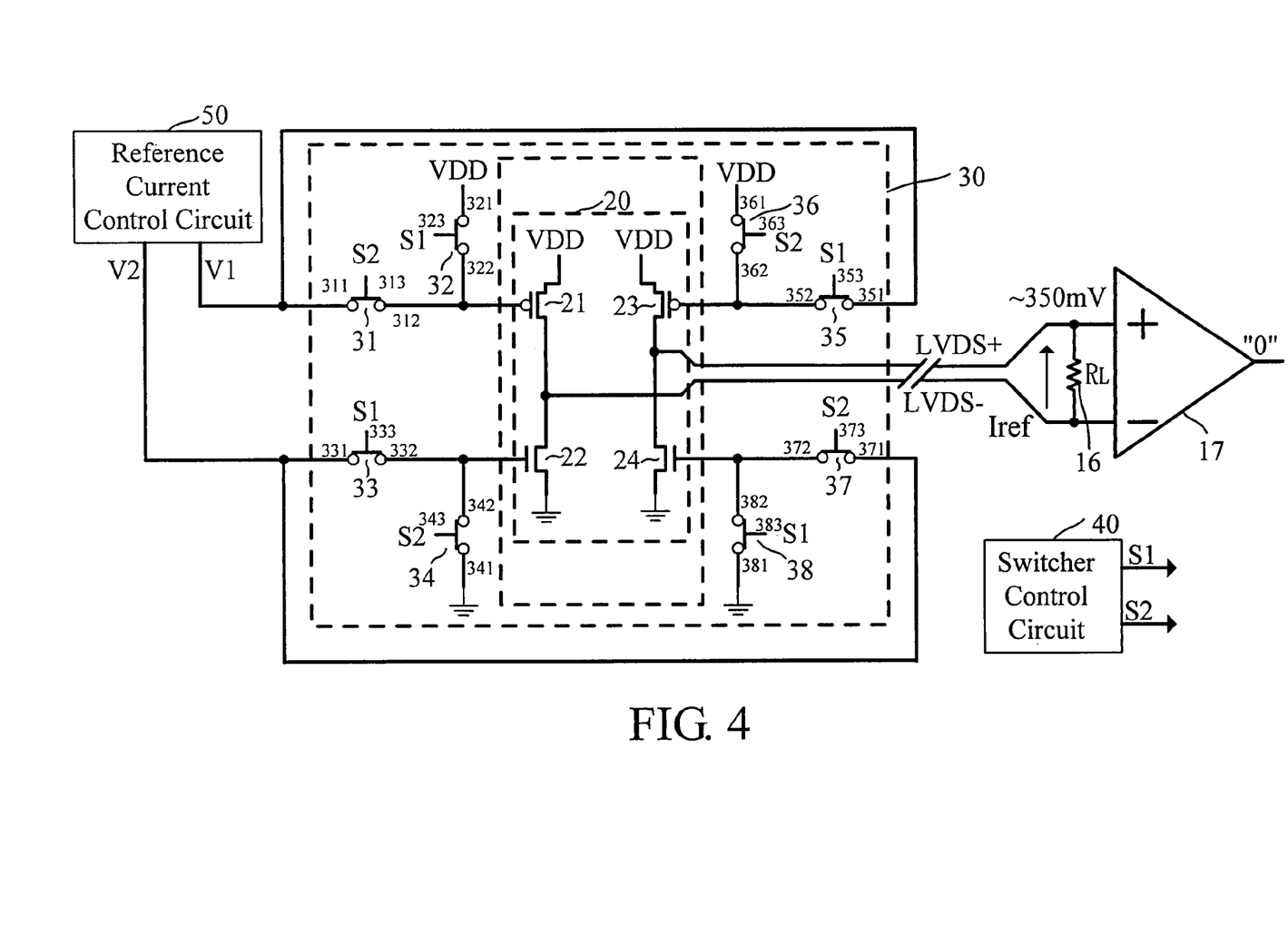
FIG. 4 is an example circuitry of an LVDS driving circuit of FIG. 3 according to the embodiment of the present invention.

FIG. 4 is an example circuitry of an LVDS driving circuit of FIG. 3 according to the embodiment of the present invention. The differential signal output circuit 20 includes four transistors 21, 22, 23, and 24. The transistor 21 and 23 are PMOS transistors coupled to an operational voltage source VDD, and the transistor 22 and 24 are NMOS transistors coupled to the ground. The transistor 23 and 24 are coupled to the first output node and the transistor 21 and 22 are coupled to the second output node of the differential signal output circuit 20. The first and the second output node are for outputting an LVDS differential signal.

In this embodiment, the switch circuit 30 includes eight switches 31~38, as shown in FIG. 4. The switch 31 is coupled to the PMOS transistor 21 and the first output node of the reference current control circuit 50, the switch 33 is coupled to the NMOS transistor 22 and the second output node of the reference current control circuit 50, the switch 35 is coupled to the PMOS transistor 23 and the first output node of the reference current control circuit 50, and the switch 37 is coupled to the NMOS transistor 24 and the second output node of the reference current control circuit 50. In addition, the switch 32 is coupled to the operational voltage source VDD and the PMOS transistor 21, the switch 34 is coupled to the ground and the NMOS transistor 22, the switch 36 is coupled to the operational voltage source VDD and the PMOS transistor 23, and the switch 38 is coupled to the ground and the NMOS transistor 24. The switches 32, 33, 35, and 38 are controlled by the first control signal S1 and the switches 31, 34, 36, and 37 are controlled by the second control signal S2.

Figure 5:
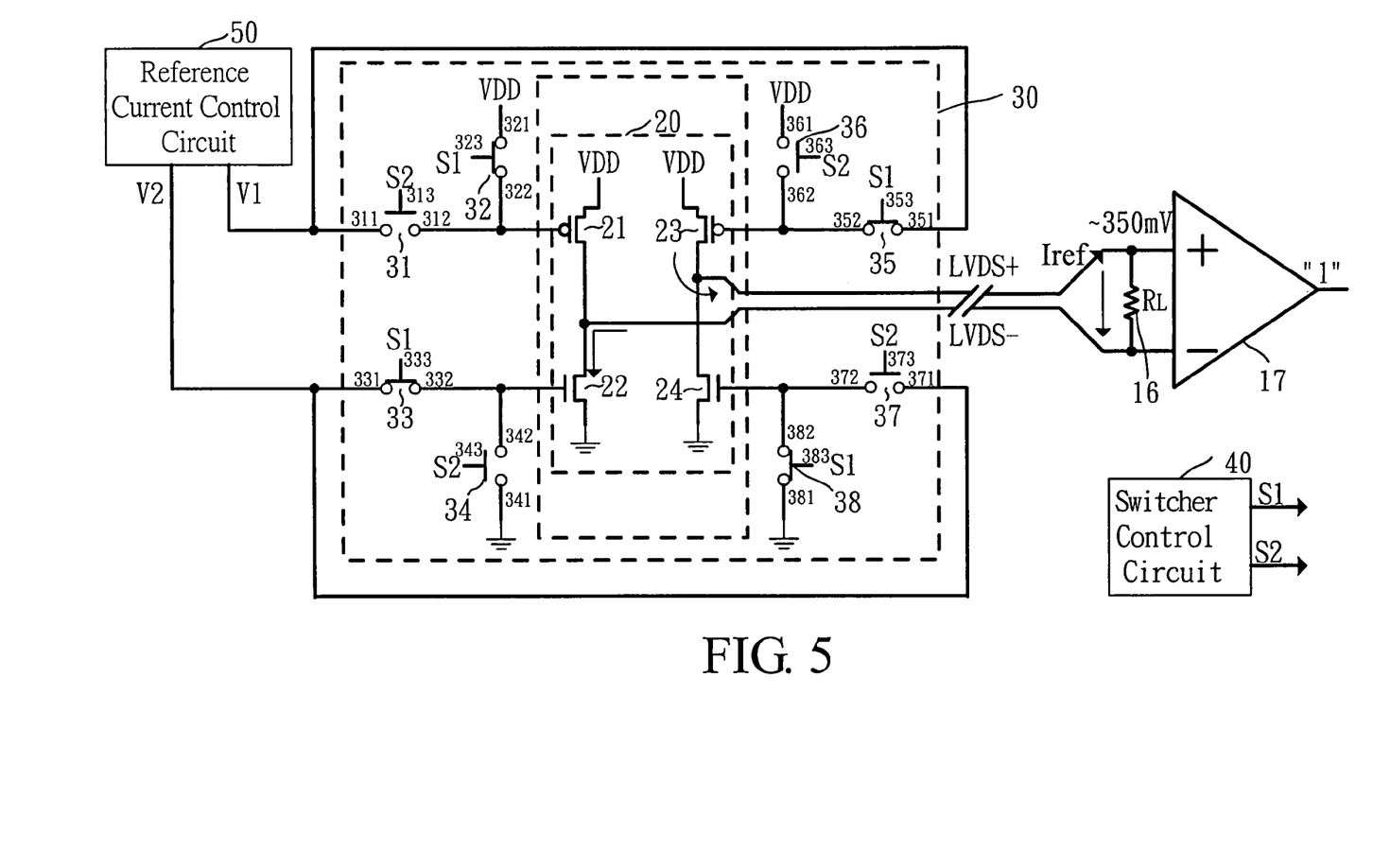
FIG. 5 is an example circuitry of an LVDS driving circuit of FIG. 4, which an output logic "1" is produced at the output-end.

FIG. 5 is an example circuitry of an LVDS driving circuit of FIG. 4, which an output logic "1" is produced at the output-end. When the control signal S1 is HIGH and S2 is LOW, the switches 32, 33, 35, and 38 are ON and the switches 31, 34, 36, and 37 are OFF, as shown in FIG. 5. In this manner, the gate of the PMOS transistor 21 is coupled to the operational voltage source VDD and the gate of the NMOS transistor 24 is coupled to the ground, thus the PMOS transistor 21 and the NMOS transistor 24 are both OFF. Besides, the PMOS transistor 23 and the NMOS transistor 22 are ON through the controlling of the first control voltage V1 and the second control voltage V2 respectively. The LVDS differential signal in a positive phase is provided such that an output logic "1" is generated by the output-end based on the positive phase LVDS differential signal.

Figure 6:
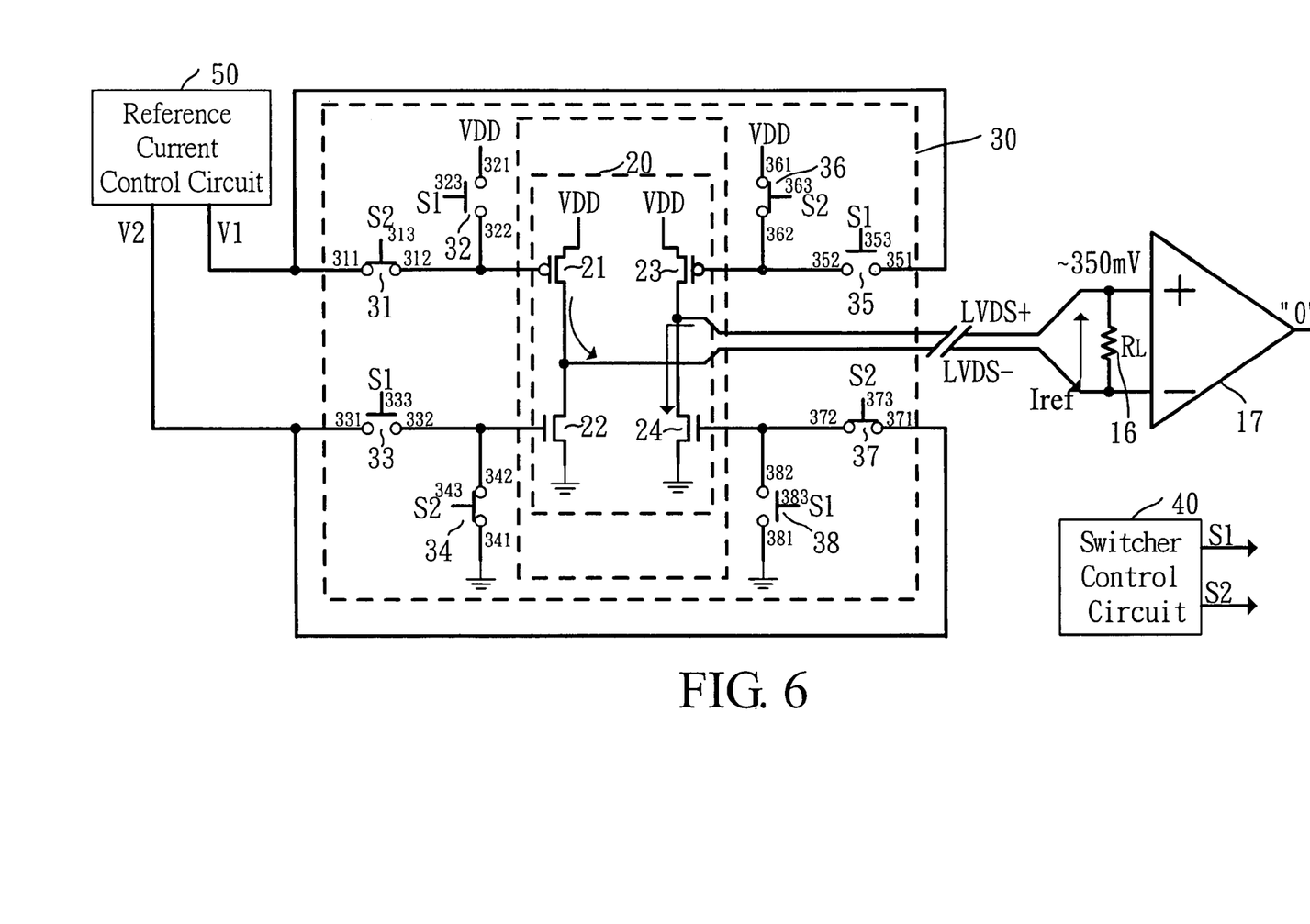
FIG. 6 is an example circuitry of an LVDS driving circuit of FIG. 4, which an output logic "0" is produced at the output-end.

FIG. 6 is an example circuitry of an LVDS driving circuit of FIG. 4, which an output logic "0" is produced at the output-end. When the control signal S1 is LOW and S2 is HIGH, the switches 32, 33, 35, and 38 are OFF and the switches 31, 34, 36, and 37 are ON, as shown in FIG. 6. In this manner, the gate of the PMOS transistor 23 is coupled to the operational voltage source VDD and the gate of the NMOS transistor 22 is coupled to the ground, thus the PMOS transistor 23 and the NMOS transistor 22 are both OFF. Besides, the PMOS transistor 21 and the NMOS transistor 24 are ON through the controlling of the first control voltage V1 and the second control voltage V2 respectively. The LVDS differential signal in a negative phase is provided such that an output logic "0" is generated by the output-end based on the negative phase of the LVDS differential signal.

The operational voltage source VDD of the LVDS driving circuit shown in FIG. 4 has to meet the limitation that $VDD > I_{ref}R_L + \Delta V_{23} + \Delta V_{22}$, wherein $\Delta V_{23}$ and $\Delta V_{22}$ are the drain-to-source voltage drops of the transistors 23 (or 21) and 22 (or 24) respectively. That is, the minimum operational power VDD of the LVDS driving circuit must be no smaller than $I_{ref}R_L + \Delta V_{23} + \Delta V_{22}$, which is much smaller compared to that of the conventional LVDS driving circuit shown in FIG. 1. In addition, since there are no current sources in the LVDS driving circuit shown in FIG. 4, a complicated control circuit is not needed to precisely control the output current of the current sources.

Figure 7:
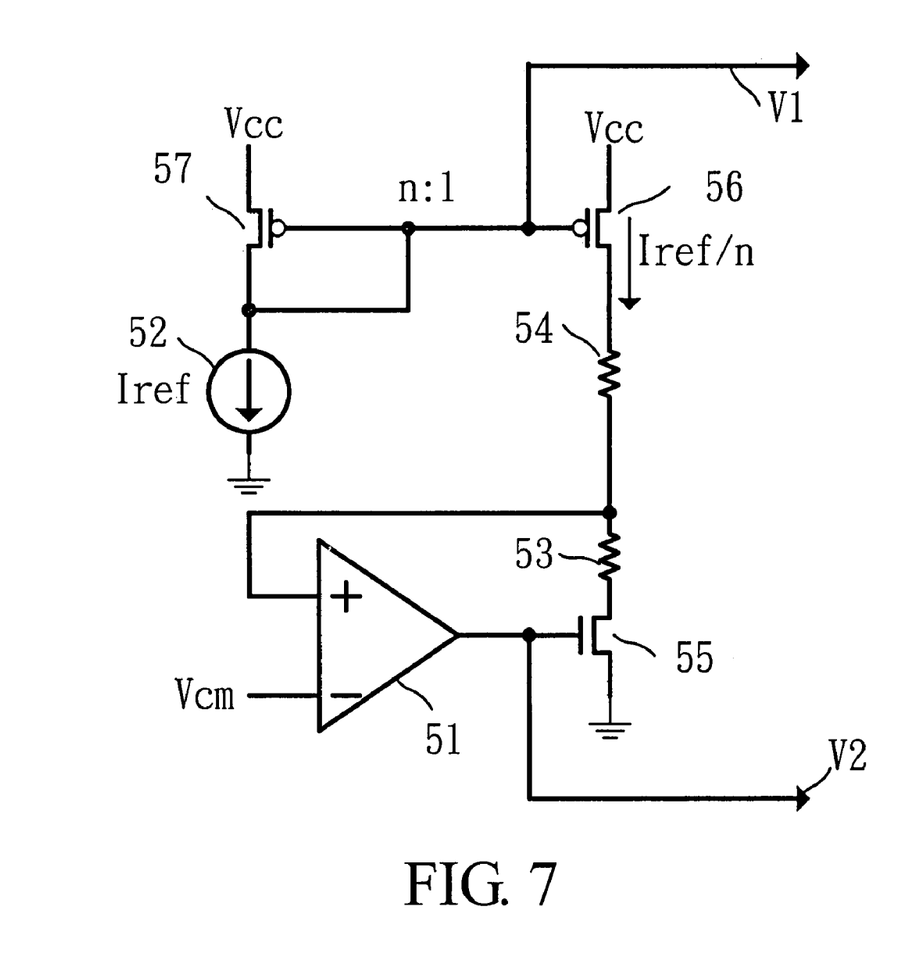
FIG. 7 is an example circuitry of the reference current control circuit according to the embodiment of the present invention.

FIG. 7 is an example circuitry of the reference current control circuit according to the embodiment of the present invention. The reference current control circuit 50 is for providing the first control voltage V1 and the second control voltage V2 to the transistors 21~24 of the differential signal output circuit 20 to control either PMOS transistor 21 and the NOS transistor 24 or the PMOS transistor 22 and the NOS transistor 23 to operate in the saturation region. In this manner, the magnitude of the LVDS differential signal outputted from the differential signal output circuit 20 can be controlled through controlling the magnitude of the first control voltage V1 and the second control voltage V2 provided by the reference current control circuit 50. In FIG. 7, the reference current control circuit 50 includes an operational amplifier 51, a current source 52, a first resistor 53, a second resistor 54, the PMOS transistors 56 and 57, and a NMOS transistor 55. Since the transistors 55, 56, and 57 are manufactured through the same manufacturing process, the $\mu nC_{ox}$ value of the transistors 55, 56, and 57 are substantially the same. Thus, through controlling the W/L ratio of the transistors 55, 56, and 57

$$\left(\text{i.e., } \frac{W_{56}}{L_{56}} : \frac{W_{57}}{L_{57}} : \frac{W_{55}}{L_{55}} = l : n : m\right),$$

the currents across the transistors 55 and 56 can be controlled as $I_{rep}/n$. Accordingly, the first control voltage V1 and the second control voltage V2 can be determined.

Although the present invention has been explained in relation to its preferred embodiment, it is to be understood that many other possible modifications and variations can be made without departing from the spirit and scope of the invention as hereinafter claimed.

What is claimed is:

1. A driving circuit for outputting a differential signal, comprising:
   an output circuit for outputting the differential signal according to a first voltage and a second voltage;
   a control signal generator, coupled to the output circuit, for generating the first voltage and the second voltage, comprising:
      a current mirror, comprising:
         a first transistor having a gate;
         a reference current generator, coupled to the gate of the first transistor, for providing a reference current; and
         a second transistor having a gate coupled to the gate of the first transistor and the reference current generator;
      a first conducting path, coupled to the gate of the first transistor, the gate of the second transistor and the reference current generator, for providing the first voltage to the output circuit according to the voltage of the gates of the first and second transistors; and
      a second voltage generator for generating the second voltage to the output circuit; and
   a switching circuit, coupled between the output circuit and the control signal generator, for controlling the coupling and decoupling relation between the output circuit and the control signal generator such that the differential signal representing logic high or logic low according to the coupling and decoupling relation between the output circuit and the control signal generator.

2. The driving circuit according to claim 1, wherein the second voltage generator couples to the current mirror and generates the second voltage according to the reference current.

3. The driving circuit according to claim 2, wherein the second voltage generator comprises:
   an operational amplifier, coupled to the current mirror, for generating the second voltage according to the reference current and a predetermined voltage; and
   a second conducting path, coupled to the operational amplifier, for providing the second voltage to the output circuit.

4. The driving circuit according to claim 1, wherein the switching circuit controls the coupling and decoupling relation between the output circuit and the control signal generator according to a switching signal and an inverse signal of the switching signal.

5. The driving circuit according to claim 4, wherein the switching circuit comprises:

a plurality of first switches, the on/off state of the first switches being determined by the switching signal; and a plurality of second switches, the on/off state of the second switches being determined by the inverse signal;

wherein the on/off state of the first switches is opposite to the on/off state of the second switches.

6. The driving circuit according to claim 1, wherein the differential signal is a low voltage differential signal (LVDS).

7. A driving circuit for outputting a differential signal, comprising:

an output circuit for outputting the differential signal according to a first voltage and a second voltage, comprising:
  a first transistor operating in response to the first voltage;
  a second transistor, coupled to the first transistor, operating in response to the second voltage;
  a first node between the first transistor and the second transistor for outputting a part of the differential signal;
  a third transistor operating in response to the first voltage;
  a fourth transistor, coupled to the third transistor, operating in response to the second voltage; and
  a second node between the third transistor and the fourth transistor for outputting the other part of the differential signal;

a control signal generator, coupled to the output circuit, for generating the first voltage and the second voltage, comprising:
  a voltage generating circuit for generating the first voltage and the second voltage;
  a first conducting path, coupled between the voltage generating circuit and the first transistor, for providing the first voltage to the first transistor according to a switching control;
  a second conducting path, coupled between the voltage generating circuit and the second transistor, for providing the second voltage to the second transistor according to the switching control;
  a third conducting path, coupled between the voltage generating circuit and the third transistor, for providing the first voltage to the third transistor according to the switching control; and
  a fourth conducting path, coupled between the voltage generating circuit and the fourth transistor, for providing the second voltage to the fourth transistor according to the switching control; and a switching circuit, coupled between the output circuit and the control circuit generator, for determining the switching control that controls the coupling and decoupling relation between the output circuit and the control signal generator such that the differential signal representing logic high or logic low according to the coupling and decoupling relation between the output circuit and the control signal generator, the switching circuit comprising:
  a first switch coupled between the control signal generator and the first transistor, the on/off state of the first switch determining whether the first conducting path provides the first voltage to the first transistor;
  a second switch coupled between the control signal generator and the second transistor, the on/off state of the second switch determining whether the second conducting path provides the second voltage to the second transistor;
  a third switch coupled between the control signal generator and the third transistor, the on/off state of the third switch determining whether the third conducting path provides the first voltage to the third transistor; and
  a fourth switch coupled between the control signal generator and the fourth transistor, the on/off state of the fourth switch determining whether the fourth conducting path provides the second voltage to the fourth transistor.

8. The driving circuit according to claim 7, wherein the on/off state of the first and fourth switches is determined by a switching signal and the on/off state of the second and third switches is determined by an inverse signal of the switching signal.

9. The driving circuit according to claim 8, wherein on/off state of the first and fourth switches is opposite to the on/off state of the second and third switches.

10. The driving circuit according to claim 7, wherein the differential signal is a low voltage differential signal (LVDS).

11. The driving circuit according to claim 7, wherein the first, second, third and fourth transistors are MOS transistors.

12. The driving circuit according to claim 11, wherein the first and third transistors are PMOS transistors while the second and fourth transistors are NMOS transistors.

* * * * *